Nov. 2, 1965   W. R. BOHNER   3,214,768
ASSEMBLY FOR MOUNTING A FACE PROTECTIVE SHIELD ON A SAFETY CAP
Filed Feb. 15, 1963
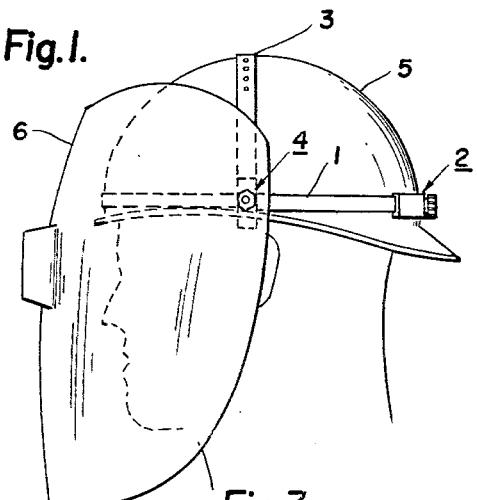
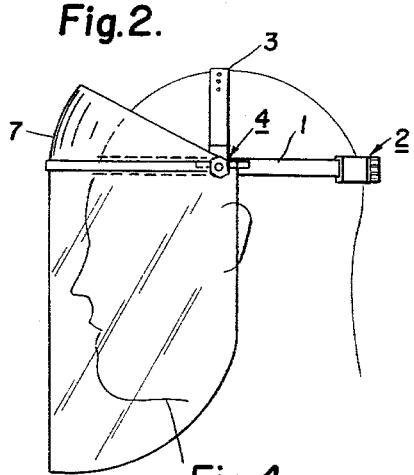
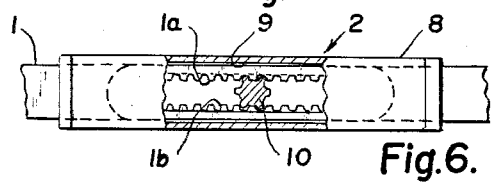
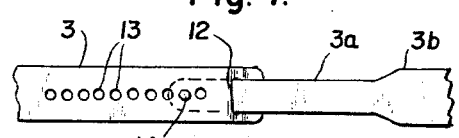
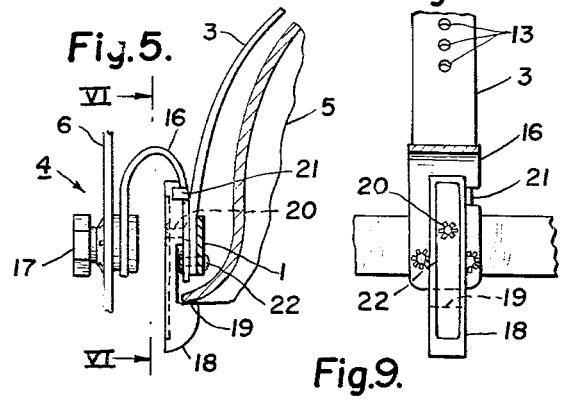
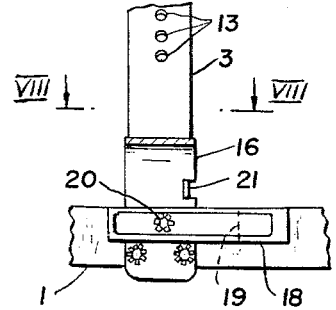
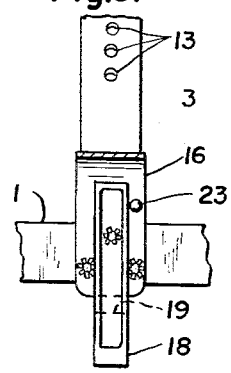
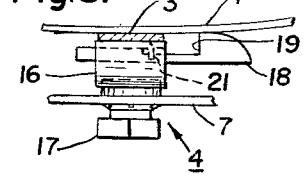
INVENTOR.
WILLIAM R. BOHNER
BY
*William J. Ruano*
his ATTORNEY United States Patent Office 3,214,768
Patented Nov. 2, 1965

3,214,768
ASSEMBLY FOR MOUNTING A FACE PROTECTIVE SHIELD ON A SAFETY CAP
William R. Bohner, Reading, Pa., assignor to The Electric Storage Battery Company, Philadelphia, Pa.
Filed Feb. 15, 1963, Ser. No. 258,865
3 Claims. (Cl. 2—10)

This invention relates to improvements in headgear assemblies for mounting face-protective elements, such as welding helmets, goggles, face-shields, etc., and, more particularly, to improvements for the purpose of providing quick detachability and attachability to either a safety cap or directly on the head of the wearer. This invention is an improvement over that shown in Patent No. 2,963,708 assigned to the present assignee. This patent covers a construction particularly suitable for mounting a face-protective shield only on a safety cap or hat, as distinguished from mounting it directly on the head of the wearer. In many instances, however, the hatless workman will wish to use this same attachment directly on his head.

The combination of a welding shield and safety cap is known in the art, however, one outstanding disadvantage of such combination as conventionally used has been that the welding shield is fastened to the cap by fastening means, such as screws and the like, which involves a certain amount of difficulty and the use of both hands for either attaching the welding shield to the safety cap or detaching it therefrom, as well as requiring appreciable time for such connection or disconnection. This is undesirable because the welder usually has an electrode holder or other equipment in one hand and has frequent necessity of removing the shield or attaching it to the safety cap during intermittent welding operations. Therefore, in the conventional combination it would be necessary for him to lay down the welding torch and then use both hands for applying the screws or other fastening elements for attaching the welding shield to the cap. Because of this inconvenience, many times the shield is not worn when it should be, therefore exposing the workman to danger.

An object of the present invention is to provide a novel welding shield and safety cap interconnection, which shield can be tilted in a conventional manner and whereby the welding shield may be easily and quickly attached to or detached from the safety cap by means of only one hand, gloved or ungloved, of the welder.

An object of the present invention is to provide a novel headgear for safety shields and the like, which may be easily and quickly attached either to a safety hat or cap, or directly on the head of the wearer.

A more specific object of the invention is to provide, in a readily detachable headgear for face-protective elements, a pair of attaching hooks which are pivotally mounted on the sides thereof so that they may be selectively pivoted either to a vertical or horizontal position, depending upon whether the headgear is to be mounted on a safety cap or directly on the head of the wearer.

Another object of the invention is to provide a novel crown strap adjustment for said headgear.

Other objects and advantages of the present invention will become apparent from a study of the following description taken with accompanying drawing wherein:

FIG. 1 is a side view of a headgear for detachably mounting a welding shield or helmet on a safety cap and embodying the principles of the present invention;

FIG. 2 is a side view showing the headgear of FIG. 1 mounted directly on the head of the wearer and having pivotally mounted thereon a face shield;

FIG. 3 is an enlarged, fragmentary view of the headband adjusting means of FIGS. 1 and 2 with a portion cut away, showing a rack and pinion adjusting means for adjusting the girth of the headband;

FIG. 4 is an enlarged, fragmentary view of the adjustable crown strap shown in FIGS. 1 and 2;

FIG. 5 is a side view of one of the pivotal mountings on opposite sides of the headgear assembly, showing how welding shield 6 is mounted, and wherein the hook 18 is shown in hooked relationship with the edge of the brim of the safety cap;

FIG. 6 is a cross-sectional view of the headgear assembly shown in FIG. 5, taken along line VI—VI of FIG. 5;

FIG. 7 is a cross-sectional view, similar to FIG. 6, but showing the hook 18 pivoted to parallel relationship to headband 1 for wear directly on the head as shown in FIG. 2;

FIG. 8 is a cross sectional view taken along line VIII—VIII of FIG. 7; and

FIG. 9 is a view similar to FIG. 6 but showing a modified form of stop element 23.

Referring more particularly to FIG. 1 of the drawing, numeral 1 denotes a headband of any suitable stiff but flexible material having overlapping end portions which are enclosed within adjusting means 2 for varying the circumference of the headband. A crown strap 3 is disposed at right angles to the headband and its ends are riveted or otherwise attached thereto, which crown strap is likewise of adjustable length to fit different hat or head sizes.

A pivotal mounting 4 in the form of a friction clamp is provided for pivotally supporting on inverted U-shaped clip 16, the welding shield 6 or any other face protective element, such as a face shield, as shown in FIG. 2, goggles, ear-protectors, etc. This mounting 4 comprises a nut 17 threaded to a flattened bolt shank and which is adjacent a spring washer so that selective turning of the nut 17 effects progressive increase in clamping friction between the shield 6 and 16 in a well known manner.

As shown more clearly in FIG. 3, racks 1a and 1b are provided on the respective overlapping end portions of headband 1 contained within the arcuate tubular element 8 so that upon rotation of the pinion gear 10, by turning of the knurled nut shown in FIGS. 1 and 2, the circumference or girth of the headband 1 may be selectively varied.

FIG. 4 shows novel adjusting means for adjusting the length of the crown strap 3 and comprising a plurality of spaced holes 13 formed in the end portion of flexible strap 3 and a pin 14 integrally secured to the end of flexible strap 3a for selective insertion in any of the holes 13 to provide adjustable length. Since strap 3a extends through slot 12 formed in a laterally offset portion at the end of strap 3, the straps 3 and 3a extend substantially along the same plane and form, in effect, a single crown strap. The enlarged portion 3b is pivoted to the opposite side of the headband from that shown in FIGS. 1 and 2.

FIGS. 5, 6, and 7 show an important, novel feature of the present invention comprising a hook 18 of stiff but flexible plastic material, having a shoulder or ledge 19 which is engageable with the bottom edge of the brim of cap 5 when the hook extends vertically downwardly, as shown in FIGS. 5 and 6. The hook is pivotally mounted on spring clip 16 by a pivot 20 so that it may be turned from the position shown in FIG. 6 to that shown in FIG. 7—that is, from a vertical to a horizontal position. Clip 16 is riveted or otherwise attached to the headband and crown strap. The horizontal position of the hook is chosen when the headgear assembly is to be mounted directly on the head of the wearer, as shown in FIG. 2. A stop element 21 in the form of a tab is notched out and bent at right angles to clip 16 so as to stop pivotal movement of the hook, as shown in FIG. 6. In turning the hook cunterclockwise, as viewed in FIG. 6, if the shoulder portion 19 should hit against the bottom edge of the headband, the hook may be sprung away from the headband because of the flexibility provided by the reduced thickness of the shank portion of the hook (see FIG. 5).

FIG. 9 shows a modification very similar in construction to FIG. 6 except that a rivet head or bolt head 23 or similar protuberance is attached to the spring clip 16 to serve as a stop element in place of the tab 21.

A further modification is to eliminate the crown strap 3—3a completely from the headband described hereinabove, whether worn on a cap or directly on the head.

Thus it will be seen that I have provided an efficient assembly including a headband and face protective element, which is so constructed that the assembly may be mounted directly on the bare head of the wearer, or may be easily and quickly attached to a safety hat or cap; furthermore, I have provided novel pivotal, hook-shaped elements on the sides of the headband which, when pivoted downwardly, may be sprung apart and snapped into hooking engagement with the edge of the cap brim, and which headband may be removed simply by springing apart said hook-shaped elements, which elements may be pivoted to a position parallel to the headband whenever the headband is to be mounted directly on the bare head of the wearer; furthermore, I have provided a novel adjustment for the crown strap of the headband assembly.

While I have illustrated and described several embodiments of my invention, it will be understood that these are by way of illustration only, and that various changes and modifications may be made within the contemplation of my invention and within the scope of the following claims.

I claim:
1. In combination with a headband, a pair of inverted U-shaped spring clips attached to opposite side portions of said headband, a face protective element having side portions pivotally mounted on the outer free legs of said clips, a pair of stiff but laterally flexible hook-shaped elements pivotally mounted on the inner legs of said clips outwardly of said opposite side portions of said headband and partially surrounded by said spring clips so that when said hook-shaped elements extend vertically downwardly in side-by-side parallel relationship to the inner legs of said clips, they can be attached to the bottom edge of a safety cap, and when they are pivotally moved to a position parallel to the headband, the headband can be worn directly on the bare head of the wearer, means for holding said hook-shaped elements in said parallel position, and a stop element on each of said spring clips for limiting pivotal movement of the hook-shaped elements to the vertically downward position.

2. A headband assembly as recited in claim 1, wherein said stop elements are in the form of tabs struck out from said spring clips.

3. A headband assembly as recited in claim 1, wherein said stop elements are in the form of rivet heads attached to said spring clips.

References Cited by the Examiner
UNITED STATES PATENTS

| | | | |
|---|---|---|---|
| 2,358,978 | 9/44 | Huntsman | 2—8 |
| 2,619,164 | 10/54 | Feldman | 2—10 |
| 2,736,027 | 2/56 | Parmelee | 2—8 |
| 2,759,188 | 8/56 | Maillart | 2—8 |
| 2,834,017 | 5/58 | Simpson et al. | 2—10 |
| 2,963,708 | 12/60 | Herbine et al. | 2—10 |
| 3,075,201 | 1/63 | Lindblom | 2—8 |
| 3,137,005 | 6/64 | Herbine et al. | 2—8 |

JORDAN FRANKLIN, *Primary Examiner.*

DAVID J. WILLIAMOWSKY, *Examiner.*